(12) United States Patent
Gelinotte

(10) Patent No.: US 7,883,408 B2
(45) Date of Patent: Feb. 8, 2011

(54) STATION FOR READING AND/OR WRITING IN ELECTRONIC GAMING CHIPS

(75) Inventor: Emmanuel Gelinotte, Beaune (FR)

(73) Assignee: Gaming Partners International, Savigny les Beaune (FR)

( * ) Notice: Subject to any disclaimer, the term of this patent is extended or adjusted under 35 U.S.C. 154(b) by 1763 days.

(21) Appl. No.: 10/631,730

(22) Filed: Aug. 1, 2003

(65) Prior Publication Data

US 2004/0229682 A1    Nov. 18, 2004

(30) Foreign Application Priority Data

May 12, 2003    (FR) .................................. 03 05681

(51) Int. Cl.
*A63F 9/24* (2006.01)
(52) U.S. Cl. .......................................... 463/25; 463/29
(58) Field of Classification Search .................. 34/867, 34/742; 40/27.5; 463/25, 29
See application file for complete search history.

(56) References Cited

U.S. PATENT DOCUMENTS

| | | | |
|---|---|---|---|
| 1,624,335 A | 4/1927 | Greer |
| 1,935,308 A | 11/1933 | Baltzley |
| 2,410,845 A | 11/1946 | Snell et al. |
| 2,450,997 A | 10/1948 | Shann |
| 2,544,118 A | 3/1951 | Went |
| 2,836,911 A | 6/1958 | Priesmeyer |
| 2,983,354 A | 5/1961 | Ember et al. |
| 3,034,643 A | 5/1962 | Keller et al. |
| 3,295,651 A | 1/1967 | Klackowski et al. |
| 3,306,462 A | 2/1967 | Cruz |
| 3,439,439 A | 4/1969 | Stimson |
| 3,670,524 A | 6/1972 | Korwin |
| 3,766,452 A | 10/1973 | Burpee et al. |
| 3,862,400 A | 1/1975 | Thomson |
| 3,882,482 A | 5/1975 | Green et al. |
| 3,926,291 A | 12/1975 | Burke et al. |
| 3,936,878 A | 2/1976 | Chrysler |
| 3,953,932 A | 5/1976 | Graves |
| 3,968,582 A | 7/1976 | Jones |
| 4,026,309 A | 5/1977 | Howard |
| 4,183,432 A | 1/1980 | Lemaire |
| 4,277,774 A | 7/1981 | Fujii et al. |
| 4,283,709 A | 8/1981 | Lucero et al. |
| 4,371,071 A | 2/1983 | Abedor et al. |
| 4,373,135 A | 2/1983 | Mohan et al. |

(Continued)

FOREIGN PATENT DOCUMENTS

AU    68546/90    7/1990

(Continued)

OTHER PUBLICATIONS

English Abstract of EP 0 424 355.

(Continued)

*Primary Examiner*—Corbett B Coburn
(74) *Attorney, Agent, or Firm*—Brownstein Hyatt Farber Schreck, LLP

(57) ABSTRACT

Station for reading and/or writing in a memory of a token having an electronic circuit, wherein the station includes a token storing system. An antenna arrangement includes antennas. At least two antennas include antenna loops that are disposed adjacently and at least partly superposed on each other so as to define an enlarged reading and/or writing area in which transmission quality is substantially homogeneous. A communication unit is adapted to exchange information with the memory via the antenna arrangement when the token is arranged in the token storing system in an orientation that allows for communication.

29 Claims, 5 Drawing Sheets

U.S. PATENT DOCUMENTS

| | | | |
|---|---|---|---|
| 4,395,043 A | 7/1983 | Gargione | |
| 4,399,910 A | 8/1983 | Gutentag | |
| 4,435,911 A | 3/1984 | Jones | |
| 4,511,796 A | 4/1985 | Aigo | |
| 4,570,058 A | 2/1986 | Havassy | |
| 4,637,613 A | 1/1987 | Bishop | |
| 4,638,171 A | 1/1987 | Gassmann | |
| 4,674,618 A | 6/1987 | Eglise et al. | |
| 4,675,973 A | 6/1987 | Siu | |
| 4,725,924 A | 2/1988 | Juan | |
| 4,755,941 A | 7/1988 | Bacchi | |
| 4,814,589 A | 3/1989 | Storch et al. | |
| 4,818,855 A | 4/1989 | Mongeon et al. | |
| 4,827,640 A | 5/1989 | Jones | |
| 4,838,404 A | 6/1989 | Smith et al. | |
| 4,926,996 A | 5/1990 | Eglise et al. | |
| 4,969,549 A * | 11/1990 | Eglise | 194/205 |
| 4,973,524 A | 11/1990 | Huebner et al. | |
| 4,999,742 A | 3/1991 | Stampfli | |
| 5,007,641 A | 4/1991 | Seidman | |
| 5,038,022 A | 8/1991 | Lucero | |
| 5,094,922 A | 3/1992 | Ielpo et al. | |
| 5,103,081 A | 4/1992 | Fisher et al. | |
| 5,159,549 A | 10/1992 | Hallman, Jr. et al. | |
| 5,166,502 A | 11/1992 | Rendleman et al. | |
| 5,179,517 A | 1/1993 | Sarbin et al. | |
| 5,216,234 A | 6/1993 | Bell | |
| 5,265,874 A | 11/1993 | Dickinson et al. | |
| 5,283,422 A | 2/1994 | Storch et al. | |
| 5,361,885 A | 11/1994 | Modler | |
| 5,367,148 A | 11/1994 | Storch et al. | |
| 5,399,847 A | 3/1995 | Droz | |
| 5,406,264 A | 4/1995 | Plonsky et al. | |
| 5,451,756 A | 9/1995 | Holzer et al. | |
| 5,487,459 A | 1/1996 | Farmont | |
| 5,498,859 A | 3/1996 | Farmont | |
| 5,561,548 A | 10/1996 | Engle | |
| 5,575,374 A | 11/1996 | Orus et al. | |
| 5,651,548 A | 7/1997 | French et al. | |
| 5,673,502 A | 10/1997 | Caterbone | |
| 5,735,742 A | 4/1998 | French | |
| 5,770,533 A | 6/1998 | Franchi | |
| 5,794,532 A | 8/1998 | Gassies et al. | |
| 5,895,321 A | 4/1999 | Gassies et al. | |
| 5,941,769 A | 8/1999 | Order | |
| 6,021,949 A | 2/2000 | Boiron | |
| 6,176,185 B1 | 1/2001 | Charlier et al. | |
| 6,264,109 B1 | 7/2001 | Chapet et al. | |
| 6,467,413 B1 | 10/2002 | Charlier et al. | |
| 6,581,747 B1 | 6/2003 | Charlier et al. | |
| 6,703,935 B1 * | 3/2004 | Chung et al. | 340/572.7 |
| 7,023,346 B2 * | 4/2006 | Balch et al. | 340/572.7 |
| 2001/0016515 A1 * | 8/2001 | Oliver | 463/25 |
| 2002/0044096 A1 * | 4/2002 | Chung | 343/742 |
| 2002/0063035 A1 | 5/2002 | Blad et al. | |
| 2004/0229682 A1 | 11/2004 | Gelinotte | |

FOREIGN PATENT DOCUMENTS

| | | |
|---|---|---|
| DE | 8909783 | 10/1990 |
| DE | 9300173 | 4/1993 |
| DE | 4400744 | 8/1994 |
| DE | 4311561 | 10/1994 |
| DE | 29505951 | 7/1995 |
| DE | 4439502 | 9/1995 |
| DE | 4440744 | 5/1996 |
| EP | 0063103 | 10/1982 |
| EP | 0147099 | 7/1985 |
| EP | 0232174 | 8/1987 |
| EP | 0266497 | 5/1988 |
| EP | 0360613 | 3/1990 |
| EP | 0376062 | 7/1990 |
| EP | 0436497 | 7/1991 |
| EP | 0436502 | 7/1991 |
| EP | 0444373 | 9/1991 |
| EP | 0424355 | 11/1991 |
| EP | 0555683 | 8/1993 |
| EP | 0564051 | 10/1993 |
| EP | 0570874 | 11/1993 |
| EP | 0613103 | 8/1994 |
| EP | 0650148 | 4/1995 |
| EP | 0694872 | 1/1996 |
| EP | 0740818 | 11/1996 |
| EP | 0769770 | 4/1997 |
| EP | 0790848 | 8/1997 |
| EP | 0815504 | 1/1998 |
| FR | 1001412 | 2/1952 |
| FR | 2554293 | 5/1985 |
| FR | 2644268 | 9/1990 |
| FR | 2656538 | 7/1991 |
| FR | 2663145 | 12/1991 |
| FR | 2727032 | 5/1996 |
| FR | 2727548 | 5/1996 |
| FR | 2739708 | 4/1997 |
| FR | 2745103 | 8/1997 |
| FR | 2749093 | 11/1997 |
| FR | 2833102 | 6/2003 |
| GB | 2075732 | 11/1978 |
| GB | 1599120 | 9/1981 |
| GB | 2077556 | 12/1981 |
| GB | 2149623 | 6/1985 |
| GB | 2153128 | 8/1985 |
| GB | 2180086 | 3/1987 |
| GB | 2191368 | 12/1987 |
| GB | 2229845 | 10/1990 |
| WO | 87/04551 | 7/1987 |
| WO | 88/01082 | 2/1988 |
| WO | 91/06068 | 5/1991 |
| WO | 92/21105 | 11/1992 |
| WO | 94/16407 | 7/1994 |
| WO | 95/08164 | 3/1995 |
| WO | 96/07153 | 3/1996 |
| WO | 96/14115 | 5/1996 |
| WO | 96/17329 | 6/1996 |
| WO | 97/27526 | 7/1997 |
| WO | 97/30414 | 8/1997 |
| WO | 99/25439 | 5/1999 |
| WO | 0108080 | 2/2001 |
| WO | 02/47023 | 6/2002 |
| WO | WO 02/47023 A1 * | 6/2002 |
| WO | 03/049048 | 6/2003 |
| WO | 2004/102731 | 11/2004 |
| ZA | 9010453 | 10/1991 |

OTHER PUBLICATIONS

English Abstract of EP 0 444 373.
English Abstract of EP 0 815 504.
English Abstract of FR 2 644 268.
English Abstract of FR 2 663 145.
U.S. Appl. No. 10/541,319, filed Jun. 20, 2005.
US Patent Application No. which is National Stage of PCT/FR2005/001973 filed on Aug. 31, 2005.
U.S. Appl. No. 10/160,065, filed Jun. 4, 2002.
U.S. Appl. No. 10/259,405, filed Sep. 30, 2002.
U.S. Appl. No. 10/467,331, filed Nov. 29, 2002.
English Language Abstract of FR 2727032.

* cited by examiner

STATION FOR READING AND/OR WRITING IN ELECTRONIC GAMING CHIPS

CROSS-REFERENCE TO RELATED APPLICATIONS

The present application claims priority under 35 U.S.C. §119 of French Patent Application No. 03 05681 filed on May 12, 2003.

BACKGROUND OF THE INVENTION

1. Field of the Invention

The present invention relates to a station for reading and/or writing in a memory of a chip including an electronic circuit, in particular a gaming chip, said station including a system for storing said chip and a communication unit adapted to exchange information with said memory via an antenna arrangement when said chip is disposed in said storage system. The antenna arrangement includes first and second antennas comprising first and second loops, respectively. It is understood that in the remainder of the description the expression "storage system" is to be interpreted in the widest possible sense and covers in particular chip racks, boxes, and trays, as well as gaming, change or cash tabletops, in gaming rooms or casinos, and including chip sorting devices, and any surface or volume adapted to receive stacked or loose chips permanently or temporarily.

2. Description of the Prior Art

The expression "gaming chip" or "casino chip" means any disk-shaped or plate-shaped article representing a value, possibly a nominal value. Chips are generally fabricated from rigid and scratch-resistant plastics materials and carry patterns varying in design and color to form a more or less complex decoration to reduce the risk of falsification and/or fraudulent reproduction. Some chips incorporate an electronic circuit including a memory for storing information concerning the chip, in particular a number or an identifier and its numerical value. Chips equipped with electronic circuits including a memory are also referred to as "electronic memory chips" and "electronic circuit chips". Different designs of chips have electronic circuits including PROM, EEPROM, or even microprocessors with associated memory.

The chip storage system, for example racks, are conventionally used to store chips at the cashier's window and/or at the gaming tables. A rack contains chips exchanged for money, for example chips or plates with different face values, cash, etc. It is also possible to take from the rack the chips necessary to pay out winning plays and to put into the rack chips collected from losing plays. The number of chips in a rack varies and consequently the overall value of the chips evolves over time.

To facilitate monitoring the chips contained in the rack and in and out movements of the chips, in order to achieve better control of those movements and thereby combat fraud more effectively, patent application WO 97/30414 proposes to provide the rack with columns for storing chips and reading and/or writing means able to communicate with the chips stored in said columns. The reading means include ferrite antennas at the top of the column or loop antennas disposed slantwise under the columns, although the latter do not have such good performance. Devices of the above kind give good results especially with ferrite antennas for a range of working frequencies from 125 kHz to 140 kHz. However, good results are more difficult to achieve at higher frequencies, for example 13.56 MHz or 2.45 GHz (the corresponding reduction in the number of turns in the antenna integrated into the chip commensurately reducing the resistance to interference caused by radiation from the ferrite antennas in the rack).

Moreover, storing chips in columns or stacks that are prepositioned prior to the writing and/or reading operations is not acceptable or appropriate in some applications, in particular for the closed storage area usually referred to as the "chip float" of American Roulette tables, for example. At this location, the chips must be stackable in different vertical stacks on the gaming table top, with no particular order or specific location.

From the patent EP 0 740 818, the person skilled in the art also knows of reading and/or writing stations including a gaming, change or cash tabletop carrying an antenna in the form of a spiral conductive layer printed on an insulative support and connected to a communication unit. The conductive layer of the antenna defines a central internal transmission area. The communication unit can exchange information with chips laid flat on the transmission area, including stacked chips.

As in the case of the chip racks mentioned above, exchanges with a chip via the antenna are effected "without contact", by means of radio waves modulated at frequencies that are usually around 125 kHz to 140 kHz. Communication conventionally requires that the chip not be "on edge", i.e. oriented parallel to the magnetic field generated by the conductive layer. The chip is preferably laid flat on the tabletop, and thus perpendicular to the magnetic field generated by the conductive layer of the antenna. Anticollision algorithms enable the communication unit to read/write all of the chips in one or more stacks.

The above type of antenna, although well suited to checking a chip or one or more stacks of chips (possibly comprising up to 20 chips) has the disadvantage of having a read/write shadow area at the internal boundary of the conductive layer, commensurately reducing the diameter of the central transmission area, for example an annular shadow area from 2 cm to 2.5 cm wide for a conductive layer with an outside diameter of 8 cm. What is more, the conductive layer of the antenna cannot be made wider at will. This is because a minimum ratio must be respected between the surface area of the antennas of the chips and the surface area of the conductive layer of the antenna.

In practice, it is considered that an antenna conductive layer must not be able to receive more than ten stacks of chips.

There is therefore a requirement for a reading and/or writing station having a large storage area or volume able to communicate reliably at high frequencies, with a memory in an electronic circuit chip disposed anywhere in the storage area.

SUMMARY OF THE INVENTION

The invention provides for a station for reading and/or writing in a memory of a token, in particular a gaming chip, incorporating an electronic circuit, wherein the station includes:

a system for storing the chip, and a communication unit adapted to exchange information with the memory when the chip is positioned in the storage system in an orientation allowing the communication via the antenna arrangement including first and second antennas comprising respective first and second loops disposed adjacently and at least partly superposed on each other so as together to define an enlarged reading and/or writing area in which transmission quality is substantially homogeneous.

As explained in more detail in the remainder of the description, superposing the loops eliminates poor transmission areas. Thus, by superposing a multitude of loops it becomes possible to create large areas of reliable transmission in said chip storage system regardless of the location of a chip within the transmission area, so that the communication unit is able to communicate reliably with a memory of that chip.

Reading and/or writing stations according to the invention are capable of operating even at modulation frequencies of several GHz, for example 2.45 GHz, by controlling the phenomena of coupling between loops. According to other preferred embodiments of the invention:

the first and second antennas each comprise an upper loop and a lower loop at least partly superposed on each other and electrically connected in parallel;

the upper loops and the lower loops of an antenna lie in two substantially parallel planes and face each other;

an area of overlap of lower surfaces defined by two superposed loops has a smallest dimension that is greater than or equal to the sum of the widths of peripheral poor transmission strips of the loops;

at least one of the loops includes a plurality of contiguous superposed turns;

the turns are superposed to a height from 4 mm to 10 mm;

the storage system has substantially parallel upper and/or lower walls serving as supports for the loops and the number, location, dimensions and areas of overlap of the loops are determined so that the communication unit can exchange the information with the chip regardless of the position of the chip provided that the chip is substantially parallel to the upper and/or lower walls;

the upper and lower walls serve as supports for the lower and upper loops, respectively;

the communication unit includes a chip discriminating system;

the communication unit includes a duplicate elimination system;

the communication unit includes a system for sequential selection of the antennas;

at least one of the antennas is electrically connected to the communication unit via a device for adjusting the phase difference between an electrical voltage at the terminals of the antenna and the electrical current flowing in the antenna;

the phase difference adjuster device is electrically connected to terminals of the antenna in the immediate vicinity of the antenna;

the station includes a plurality of antennas partially or wholly integrated into a gaming, change or cash table or into a chip sorting device; and the station includes a plurality of antennas partly or wholly integrated into a portable and/or removable chip storage device, in particular a chip rack, mobile tray or box.

The invention also provides antenna means conformed so that they can be incorporated into a reading and/or writing station according to the invention and including first and second antennas respectively comprising at least partly superposed first and second loops.

The invention further provides a method of adjusting a reading and/or writing station according to the invention, which method includes the following successive stages:

a) completely wiring the reading and/or writing station;

b) electrically connecting the first antenna and adjusting the phase difference between the electrical voltage at the terminals of the first antenna and the electrical current flowing in the first antenna to a predetermined value; and c) electrically connecting the second antenna and adjusting the phase difference between the electrical voltage at the terminals of the second antenna and the electrical current flowing in the second antenna to a predetermined value.

The invention also provides for a station for reading and/or writing in a memory of a token having an electronic circuit, wherein the station comprises a token storing system. An antenna arrangement comprises antennas. At least two of said antennas comprises at least one antenna loop. The at least one antenna loop of one of said at least two of said antennas and the at least one antenna loop of another of said at least two of said antennas is disposed adjacently and being at least partly superposed on each other so as to define an enlarged reading and/or writing area in which transmission quality is substantially homogeneous. A communication unit is adapted to exchange information with the memory via the antenna arrangement when said token is arranged in the token storing system in an orientation that allows for communication.

The token may comprise a gaming chip. Each of the antennas may comprise respective first and second loops. Each of the antennas may comprise an upper loop and a lower loop at least partly superposed on each other and electrically connected in parallel. Each upper loop and each lower loop may lie in two substantially parallel planes and face each other.

The station may further comprise at least one area of overlap between the antenna loops. At least one of the antenna loops may include a plurality of contiguous superposed turns. The plurality of contiguous superposed turns may be superposed to a height in the range of between 4 mm and 10 mm.

The token storing system may comprise a storage tray. The token storing system may comprise substantially parallel upper and lower walls serving as supports for the antenna loops. The antennas may be arranged to allow the communication unit to exchange said information with said token regardless of a position of said token in the token storage system and provided that said token is substantially parallel to said upper and lower walls. Each of the antennas may respectively comprise first and second antenna loops having areas of overlap. The token storing system may comprise substantially parallel upper and lower walls serving as supports for the first and second loops. The communication unit may include a chip discriminating system. The communication unit may include a duplicate elimination system. The communication unit may include a chip discriminator. The communication unit may include a duplicate eliminator. The communication unit may include a system for sequential selection of said antennas.

At least one of said antennas may be electrically connected to said communication unit via a phase difference adjusting device. The phase difference adjusting device may provide adjustment between an electrical voltage at terminals of said antennas and an electrical current flowing in said antennas. The phase difference adjusting device may be electrically connected to terminals of said antenna arrangement in an immediate vicinity thereof.

The station may further comprise at least one of a gaming table, a change table, a cash table, and a chip sorting device. The station may further comprise a plurality of antennas partially or wholly integrated into at least one of the gaming table, the change table, the cash table, and the chip sorting device. The token storing system may comprise one of a portable storage device, a removable storage device, a chip rack, a mobile tray, and a box.

The station may further comprise a plurality of antennas partially or wholly integrated into at least one of the portable storage device, the removable storage device, the chip rack, the mobile tray, and the box.

The invention also provides for an antenna arrangement for a token storage device which comprises a plurality of antennas. At least two of said plurality of antennas comprises at least one antenna loop. The least one antenna loop of one of said at least two of said antennas and the at least one antenna loop of another of said at least two of said antennas being disposed adjacently and being at least partly superposed on each other so as to define an enlarged reading and/or writing area in which transmission quality is substantially homogeneous. The antenna arrangement is adapted to exchange information with a memory of a token when said token is arranged in the token storing device in an orientation that allows for communication.

The invention also provides for a method of making the station described above wherein the method comprises wiring said station, electrically coupling the at least two of said antennas to the communication unit, adjusting a phase difference between an electrical voltage at terminals of one of the at least two of said antennas and an electrical current flowing in the one of at least two of said antennas to a predetermined value, and adjusting a phase difference between an electrical voltage at terminals of another of the at least two of said antennas and an electrical current flowing in the another of the at least two of said antennas to a predetermined value.

If applicable for any remaining non-adjusted antenna, the method provides for sequentially adjusting a phase difference between voltage at terminals of the non-adjusted antenna adjacent to the just previously adjusted antenna and an electrical current flowing in said non-adjacent antenna adjacent to the just previously adjusted antenna.

The invention also provides for the combination of a communication device and a storing device having a token storing area defined by walls for storing tokens having an electronic circuit, wherein the combination comprises an antenna arrangement coupled to at least one of the walls. The communication device is connectable to the antenna arrangement and is adapted to exchange information with the tokens via the antenna arrangement when said tokens are arranged in the storing device in an orientation that allows for communication.

The antenna arrangement may comprise antennas. Each of at least two of said antennas may comprise at least one antenna loop, one at least one antenna loop and another at least one antenna loop being disposed adjacently and are at least partly superposed on each other so as to define an enlarged reading and/or writing area in which transmission quality is substantially homogeneous. One of said antennas may be arranged on a wall and another of said antennas may be arranged on a different parallel wall.

The storing device may comprise a tray and a lid and wherein one at least one antenna loop is arranged on the lid and another at least one antenna loop is arranged on the tray. Two antenna loops may be arranged on the lid and two antenna loops are arranged on the tray. The communication device may comprise multiplexing circuit, an electronic read/write circuit and a processor. The antenna arrangement may comprise a plurality of antenna loops having areas of overlap.

The invention also provides for a method of providing communication between tokens and the storing device described above wherein the method comprises arranging the tokens in the storing device and providing communication between the tokens and the communication device via the antenna arrangement.

BRIEF DESCRIPTION OF THE DRAWINGS

The following description with reference to the appended drawings explains the advantages of the invention.

DETAILED DESCRIPTION OF THE PREFERRED EMBODIMENTS

In the nonlimiting figures listed above, components are not necessarily shown to the same scale. The same reference numbers have been used in the various figures to designate identical or similar components. Dimensions are provided by way of example only.

Figure 1:
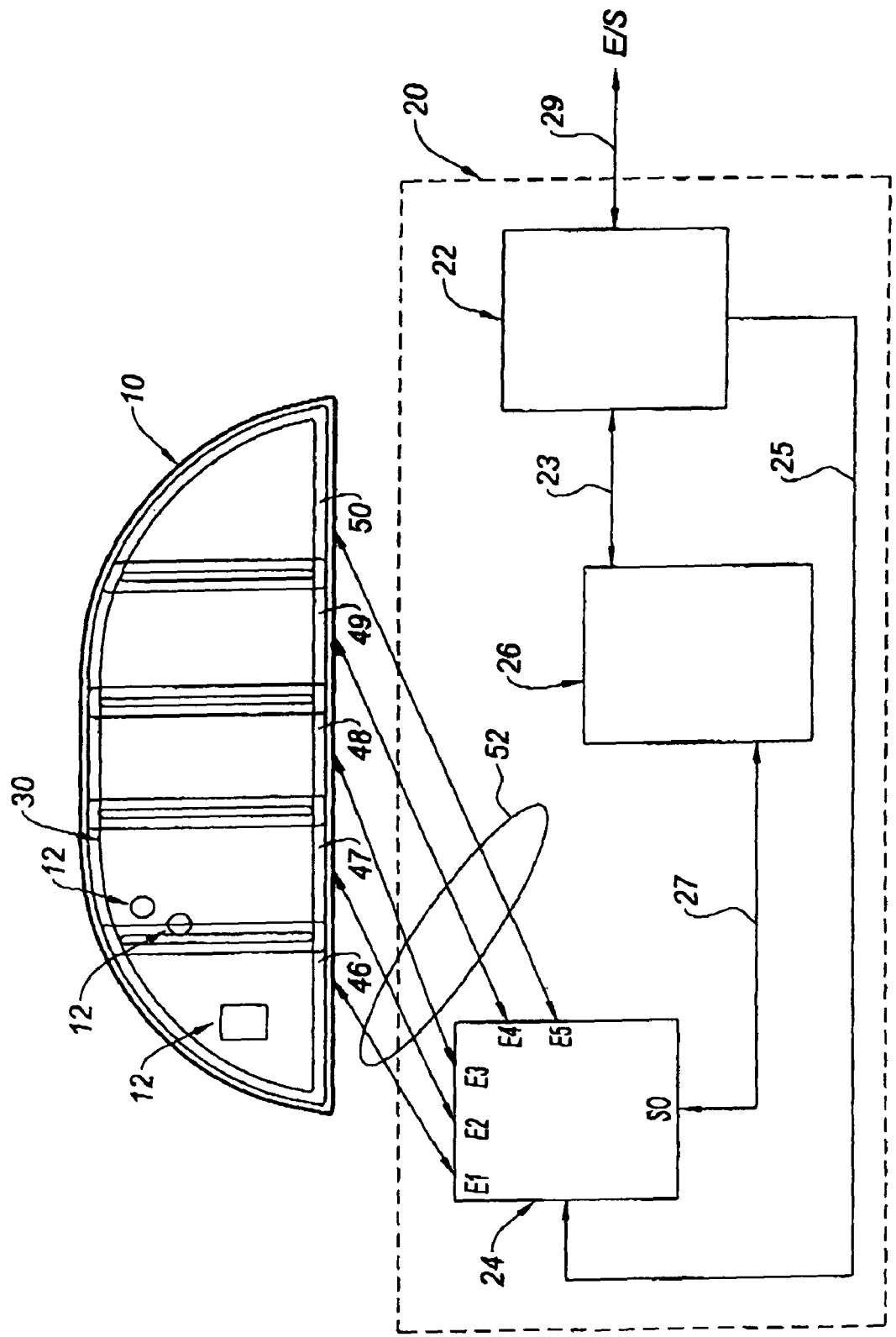
FIG. 1 shows diagrammatically a reading and/or writing station architecture conforming to the invention.

The reading and/or writing station according to the invention shown in FIG. 1 essentially comprises a storage system in the form of a tray 10 adapted to accommodate gaming chips 12 (shown in the figure in the form of rectangular plates and disks), possibly stored in stacks, and a communication unit 20 associated with an antenna arrangement 30 consisting of five flat loop antennas 46 to 50.

Two terminals of each antenna 46 to 50 are connected by a multiple line 52 to double inputs E1 to E5 of a multiplexing card 24 forming a sequential antenna selection interface. The output S0 of the card 24 is connected by a bidirectional line 27 to an electronic read/write circuit card 26 including a system for reading and writing in the memory of chip 12 controlled by a microprocessor-based processor unit 22, in this instance a personal computer (PC).

The processor unit 22 controls the read/write card 26 via the line 23 and the multiplexing card 24 via the line 25. In the conventional way, the processor unit 22 communicates with the outside world (display peripheral, keyboard, modem, network interfaces, server, etc.) via input/output (I/O) lines 29, either in point to point mode or in network mode. Without departing from the scope of the invention, a simplified version of the communication unit 20 includes only a system for reading the chip memory, the structure and operation of which are similar to what is described hereinafter for the read/write unit 26.

The processor unit 22 conventionally comprises a time and date circuit adapted to specify the time and the date of each event and an EEPROM for storing data exchanged with the electronic chips. It is normally equipped with a keyboard and a display screen, not shown. The keyboard is used, for example, to enter into the system information such as commands to open and/or close the gaming table with which the read and/or write station is associated, to enter the name of the operator, etc. Similarly, the screen can display some or all of the following information: total number of chips in the storage system 10, number of chips of each denomination, and total value of chips in the storage system 10.

The read/write card 26 includes a microprocessor which generates and interprets signals exchanged with the electronic memory chips and an oscillator which generates the carrier frequency of the radio frequency signal fed to the antennas (for example a frequency from 125 kHz to 140 kHz or 13.56 MHZ or 2.45 GHz). The card 26 also includes an analog-to-digital converter, a modulator and an amplifier. Based on commands and information from the computer 22, the card 26 generates an amplitude modulated radio frequency analog signal which conveys power, data and a synchronization signal to the electronic memory chips via the selected antenna.

Figure 2:
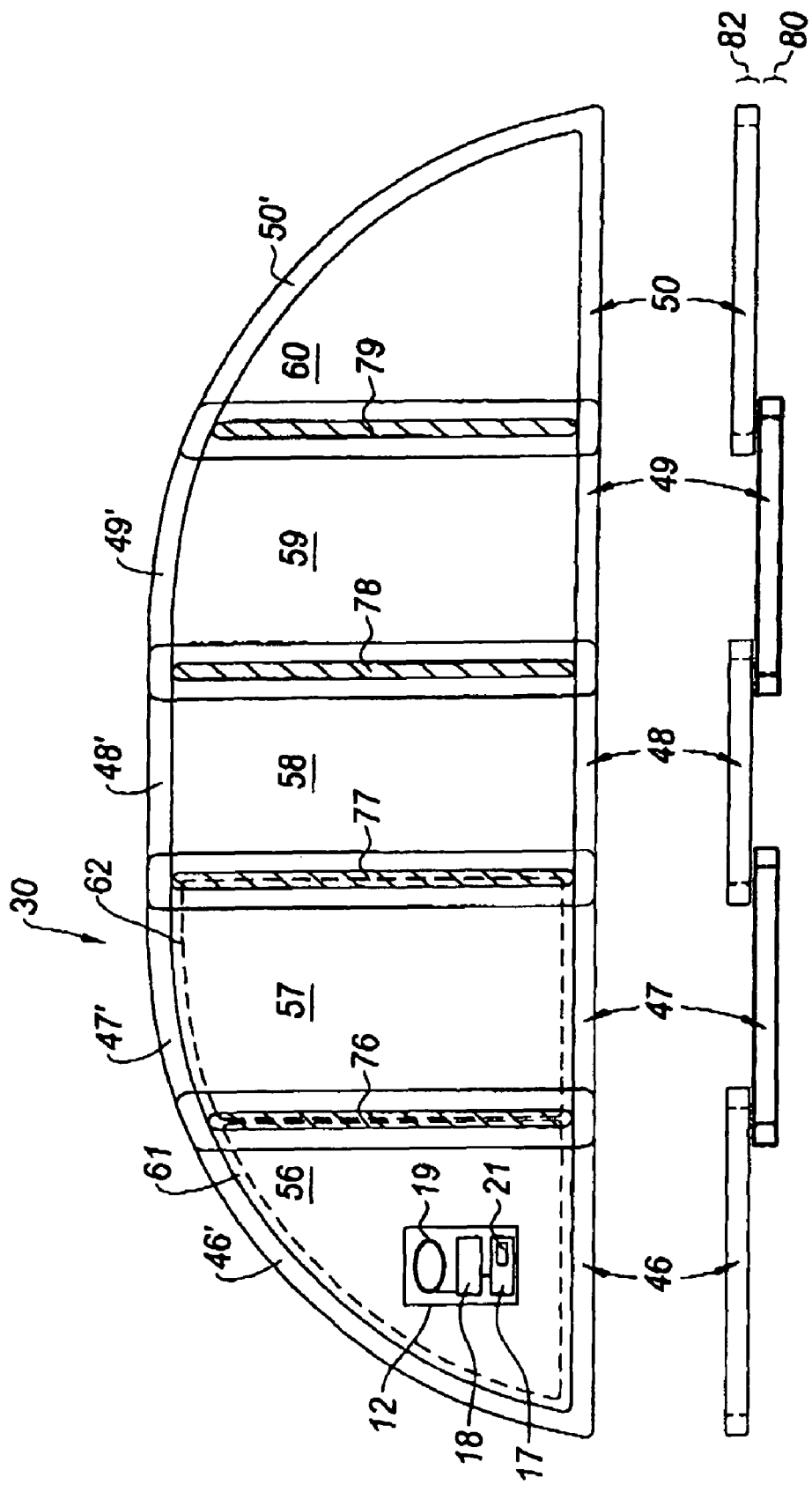
FIGS. 2a and 2b are respectively diagrammatic and front views of antenna means of a "monoplane" variant of the invention.

The disk or plate chip 12 shown in FIG. 2a is a passive (i.e. having no internal energy storage device) read-only or read/write chip. It includes an electronic circuit 17 with a memory 21 and a transceiver 18 adapted to communicate "without contact" via an internal antenna 19. The quality of communication depends on the orientation of the chip 12 relative to the antenna arrangement 30. The chip 12 is preferably laid flat or stacked on the transmission area defined by the antennas 46-50.

The simplest version of the electronic circuit 17 is a microcircuit equipped with a non-reprogrammable memory 21 (for example a PROM), with a single identification code on 32 or 64 bits whose field can include the serial number of the chip 12.

A more sophisticated version of the chip 12 is equipped with a reprogrammable memory 21 (for example an EEPROM) that can be read and written and uses a code that can evolve. This ability to modify the information contained in the memory 21 makes the electronic chip 12 more secure, in particular by enabling authentication parameters to be changed. Similarly, it is possible to personalize certain areas of the memory 21 and then configure them, reversibly or otherwise, as a read-only memory area or a read/write memory area. The memory 21 can contain the serial number of the chip 12 or a batch of chips, the nominal value, and other information such as the name of the casino, etc.

An even more sophisticated version of the chip 12 is equipped with a microprocessor capable of carrying out processing operations and complex transactions. Dialog between the communication unit 20 and the chip 12 is optionally authorized only after mutual authentication, by entry of password and/or cryptography key type codes into the chip 12 and the communication unit 20 (in particular to encrypt the data during its transfer between the communication unit 20 and the chip 12).

The memory 21 contains coded information specific to the chip 12 so that the latter can be identified and authenticated by an appropriate reader unit (a read-only unit or a read/write unit operating in read mode).

The internal antenna 19, which is of the conventional circular coil type, is implanted in the core of the chip 12 and adapted to receive energy and information through inductive coupling to the antenna arrangement 30. The internal antenna 19 transmits the energy necessary for the electronic circuit 17 and the transceiver 18 to operate. Finally, it transmits data to the antenna arrangement 30.

The working distance between the antenna arrangement 30 and the internal antenna 19 of the chip 12 is defined as a function of the magnetic flux necessary for correct operation of the electronic circuit of the chip 12 and therefore depends on the inductance, the geometry of the internal antenna 19 and the antenna arrangement 30, and the antenna current in the antenna arrangement 30.

The electronic circuit and the associated software are preferably adapted to read and/or write a plurality of chips simultaneously or to discriminate between the chips, in such a fashion as to work on stacked chips. They further includes a system, in particular software, for eliminating duplicates (chips read two or more times).

In the preferred embodiment of the invention, the communication unit 20 incorporates a discrimination function, in particular in the card 26, so that it can dialog with each of the chips 12 in one or more stacks placed on top of an antenna, for example the antenna 46, when the antenna is active. The communication unit 20 captures the identity of a first chip and then performs the required read and/or write operations on that chip. The communication unit 20 then deactivates the chip by sending it a standby command before continuing its interrogation in search of other chips in the working area of the active antenna 46, until all of the chips present have been captured.

After capture and/or processing of the last chip, the communication unit 20 sends a command for reactivating all of the chips placed on top of the antenna 46, and then moves on to another antenna, until it has read all of the chips present on the tray 10. This chip discrimination function is also known as an anticollision function.

The structure and the fabrication of the electronic circuit chips 12 with memory are not described in more detail here. For example, the patent application EP-A-0694872 describes chip structures that can be used in the context of the present invention. Similarly, the patent application WO 97/30414 previously cited contains further information on the general mode of operation of electronic devices for storing gaming chips.

On the subject of the duration of transactions, the performance that can be achieved from the station according to the invention with existing components using the 125 kHz technology is of the order of a period of around ten seconds to capture around 100 chips.

It is therefore possible for the communication unit 20, by communicating with the memory 21 of each of the chips 12, to determine in real time the number of electronic memory chips contained in the storage system 10, the value of each chip, the instantaneous total value contained in the storage system 10, the identity of each chip, the value per denomination, or any other information associated, for example, with the identity of the chip. The information can be stored, processed in real time, or transmitted to a server via a network for the purposes of carrying out any required analyses and processing.

Each antenna 46-50 is formed of a copper-based electrical wire with a diameter from 0.8 mm to 1 mm, coiled to define a respective loop 46'-50' with several turns. The expression "interior surface" 56, 57, 58, 59 and 60 refers to the surface delimited by the loop of the respective antenna 46, 47, 48, 49 and 50. The turns are preferably superposed, preferably to a height from 4 mm to 10 mm. The shape and the dimensions of each loop 46'-50' are determined so that homogeneous transmission quality makes communication with a chip 12 placed or stacked in the central area of the loop reliable.

The antennas 46-50 are spread over the tray 10 to occupy substantially all of the surface. The antennas 46-50 preferably project beyond the edge of the surface of the tray 10 adapted to receive chips 12. The interior surface 56-60 of a loop 46'-50' includes a peripheral strip (shown in FIG. 2a only for the loops 46' and 47', and respectively identified by the reference numbers 61 and 62), approximately 5 mm to 10 mm side, in which transmission is generally of poor quality. To prevent a chip 12 from being placed in line with this peripheral strip 62, the antennas 46-50 must project at least by the width of the peripheral strip 62.

In a first embodiment shown in FIGS. 2a and 2b, which is of the "monoplane" type, the loops 46'-50' of the antennas 46-50 are partially superposed two by two. The interior surfaces 56 and 60 of the antennas 46 and 50 partially overlap the interior surfaces 57 and 59 of the antennas 47 and 49, respectively, and the interior surface 58 of the antenna 48 partially overlaps the surfaces 57 and 59 of the antennas 47 and 49.

The substantially elongate overlap areas 76, 77, 78, and 79, shown cross-hatched, reduce or even eliminate poor transmission strips which would be present at the periphery of the interior surface of the loops if there were no such overlap.

The dimensions of an area of overlap of two loops, for example the loops 46' and 47', are defined to limit the overlap areas of the poor transmission peripheral strips 61 and 62, respectively, of the two loops. The overlap areas of these peripheral strips constitute non-optimum transmission areas.

The smallest dimension of the area 76 of overlap of the two loops 46' and 47' is preferably greater than or equal to the sum of the widths of the peripheral poor transmission strips 61 and 62 of the two loops. For example, if the loops 46' and 47' have peripheral strips 61 and 62 that are 8 mm wide, the width of the overlap area 76 is preferably at least 16 mm.

The dimensions of the overlap areas 76, 77, 78, and 79 depend on the chips 12 used, in particular on their dimensions. Simple trials will enable the person skilled in the art to determine the optimum dimensions of the overlap areas as a function of the intended application.

The overlapping in accordance with the invention of the interior surfaces of the antenna loops produces a large reliable transmission area through the partial superposition of a plurality of small area loop antennas.

The superposed antennas are preferably bonded together in their areas of contact.

The superposed antennas preferably lie in a lower layer 80 and an upper layer 82, as shown in FIG. 2b. When the number of antennas needed to occupy the surface of the tray 10 adapted to receive chips is odd, the number of loops in the upper layer 82 is preferably greater than the number of loops in the lower layer 80. This arrangement has the advantage of increasing the number of antennas in the layer nearest the chips 12, i.e. in the top layer 82.

Figure 3:
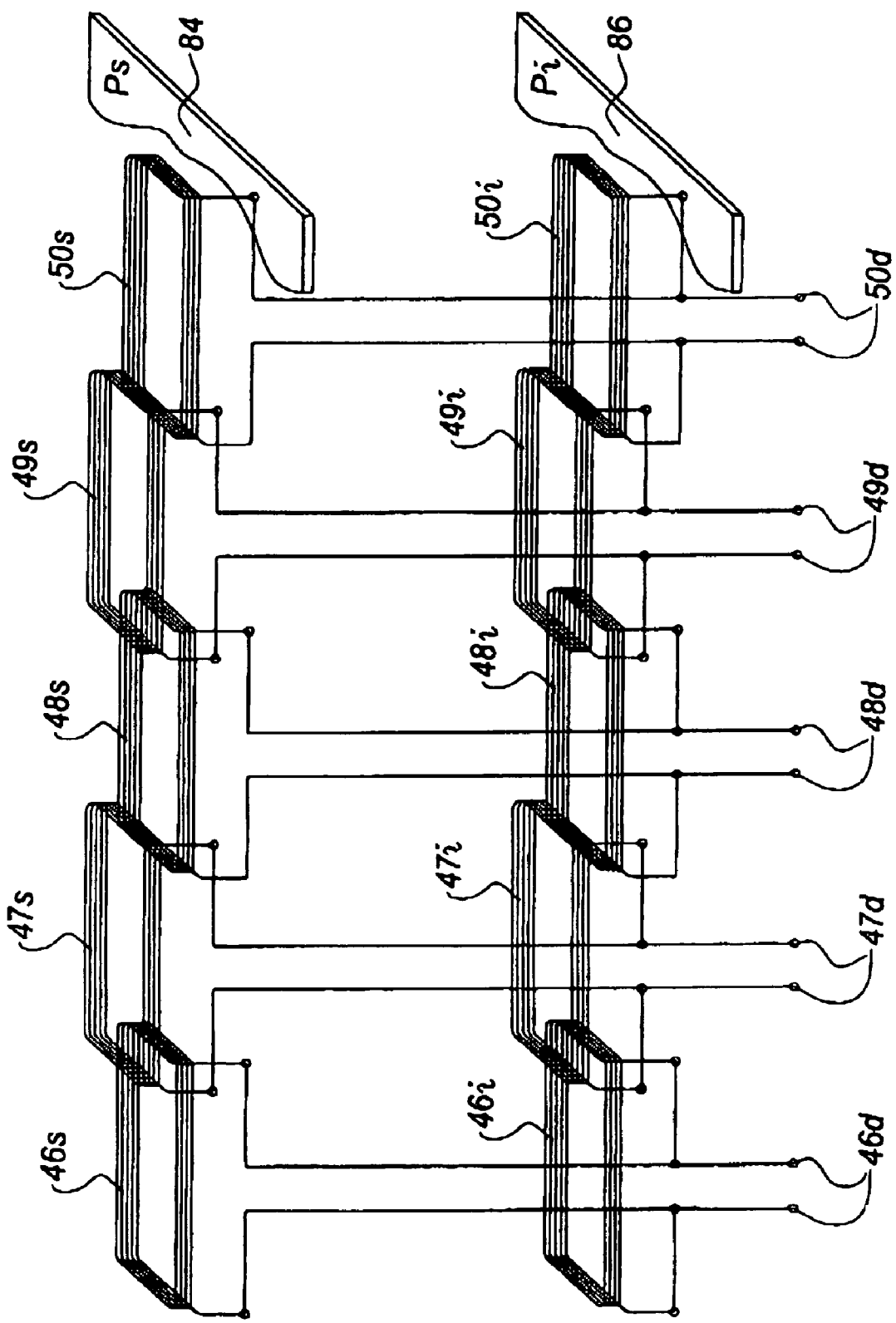
FIG. 3 is a diagrammatic perspective view of an antenna arrangement conforming to a "biplane" variant of the invention.

In a second variant of the invention shown in FIG. 3, which is of the "biplane" type, the antennas 46-50 each comprise an upper loop 46s-50s and a lower loop 46i-50i electrically connected in parallel. The lower loops 46i-50i are at least partly superposed two by two, like the loops of the antenna arrangement 30 of the first embodiment of the invention described above (FIGS. 2a and 2b). Similarly, the upper loops 46s-50s are at least partly superposed two by two.

The upper loops 46s-50s and the lower loops 46i-50i lie in two substantially parallel planes Ps and Pi, respectively, with the lower and upper loops of an antenna facing each other.

The planes Ps and Pi are preferably the surfaces of horizontal and substantially parallel upper walls 84 and/or lower walls 86, shown in part, which support the loops 46s-50s and 46i-50i, respectively, and are used as a lid and a storage tray, respectively, of a chip storage box. The distance between the cover 84 and the tray 86 is preferably determined so that the communication unit 20 can exchange information with any chip 12 placed or stacked on the tray 86 and under the cover 84, regardless of the height of the stack. For example, a "biplane" type read and/or write station can read stacks of approximately 30 gaming chips each approximately 3 mm thick.

By way of nonlimiting example, a storage box with a reading station in accordance with the invention is used to constitute the closed storage area usually referred to as the "chip float" of American Roulette tables, in which case the box is integrated into the table.

Figure 5:
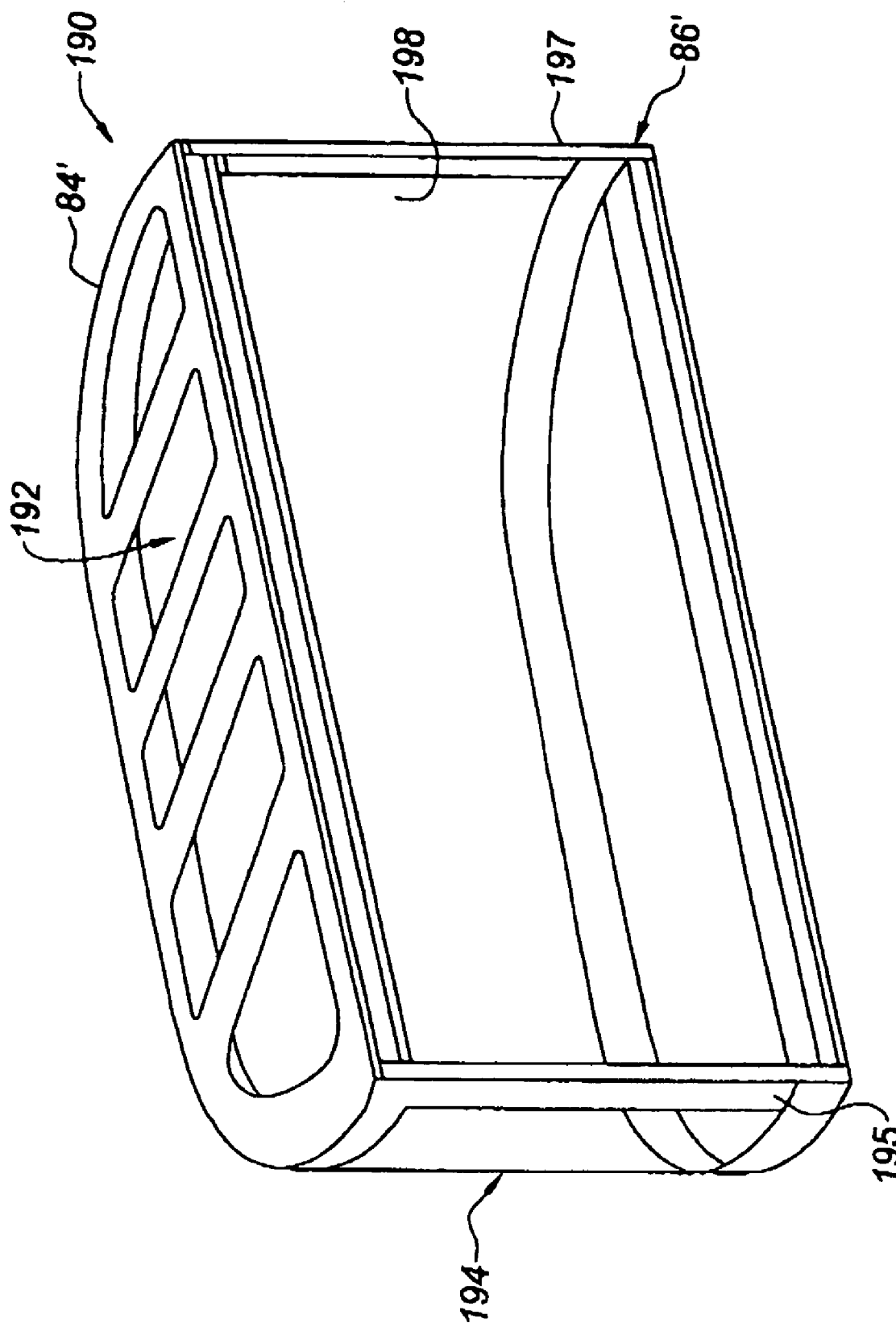
FIG. 5 is a diagrammatic perspective view of a portable chip box integrating a reading and/or writing station conforming to a "biplane" variant of the invention.

FIG. 5 is a perspective view of one example of a portable "biplane" type chip box 190. The box 190 has a lower wall 86' that incorporate five loops similar to the loops 46i-50i described above and an upper wall 84' which incorporate five loops similar to the loops 46s-50s described above. The upper wall 84' includes five transparent material windows 192 and is held parallel to the lower wall 86' by a wide U-shaped transparent lateral wall 194, as shown in FIG. 5, and by two end pillars 195 and 197 also used to pass cables between the lower and upper loops. The box 190 is completed by a plane transparent mobile wall 198 sliding vertically on the two pillars 195 and 197.

There are many applications of reading and/or writing stations according to the invention, including applications using "fixed" antennas at least partly integrated into a gaming, change or cash table or a chip sorter and applications integrated into portable and/or removable chip storage units such as chip racks, portable boxes and trays. Obviously, the same gaming table can incorporate a plurality of fixed or removable read and/or write stations according to the invention, especially American Roulette tables, for diverse functions such as managing chips not yet assigned a value, detecting the placing of stakes in the playing area of the gaming table, etc. according to the teachings of the patent FR-B-2.749.093.

Figure 4:
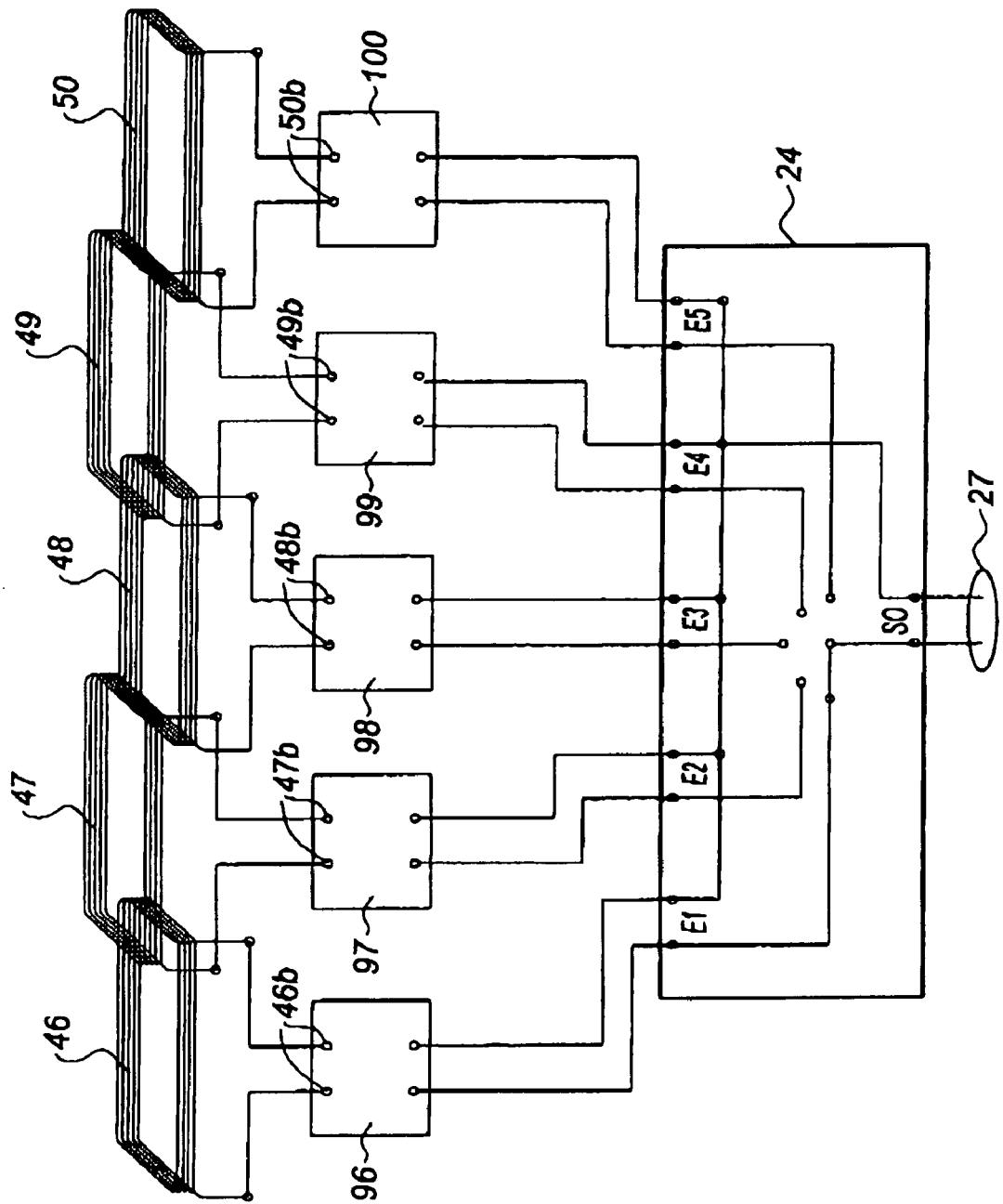
FIG. 4 shows diagrammatically an antenna wiring architecture conforming to the invention.

To summarize, reading stations according to the invention can be used fixedly or removably in association with gaming, change or cash tabletops for gaming rooms or casinos, chip sorters or any surface or volume adapted to receive stacked or loose chips permanently or temporarily. The overlapping of the antenna loops can give rise to interference caused by electromagnetic coupling between the antennas, that increases as the working frequency increases. To eliminate or limit these effects, each antenna 46-50 is electrically connected to the sequential antenna selector means 24 via a device 96-100 for adjusting the relative phase of the electrical voltages at the terminals of the antennas and the electrical currents flowing therein, as shown in FIG. 4. Each phase adjuster device 96-100 is preferably connected in the immediate proximity of the antenna 46-50 for which it is intended. The phase adjuster device 96-100 is preferably connected directly to the terminals of the antenna 46-50, which are respectively referenced 46b-50b and 46d-50d in the "monoplane" and "biplane" variants shown in FIGS. 4 and 3, respectively.

After the reading and/or writing station according to the invention has been wired completely, each antenna 46-50 is adjusted in succession by electrical connection to the sequential selector system 24 followed by adjusting said phase difference to an optimum value, readily determined by the person skilled in the art by simple trial and error. This value is preferably substantially equal to zero.

This method of adjusting the reading and/or writing station according to the invention has the advantage of limiting the interference caused by the presence within the loops of the mass of metal consisting of portions of adjacent loops. This method further limits electromagnetic coupling between loops.

Of course, the present invention is not limited to the embodiments described and shown hereinabove, which are provided by way of illustrative and nonlimiting example.

The shape, number, disposition and location of the antennas of the communication unit 20 and the antenna selection interface 24 can be adapted as a function of fabrication constraints and/or diverse specifications, in particular as set by casino operators.

In particular, the antennas 46-50 can be disposed within the thickness of the tray 10 or above or below the tray 10, especially in the "monoplane" variant. A position under the tray 10 has the advantages of easy mounting and the fact that the tray 10 remains perfectly flat.

The positions of the antennas in a station according to the invention could equally well be different from those described. The person skilled in the art will know how to determine the optimum positions of the antennas as a function of the positions and orientations of the chips.

There is claimed:

1. A station for reading and/or writing in a memory of a token having an electronic circuit, said token being arranged in a stack of two or more tokens, said station comprising:
a token storing system;
an antenna arrangement comprising first and second antennas;
at least one of the first and second antennas comprising antenna loops disposed adjacently and being at least partly superposed on each other so as to define an enlarged reading and/or writing area in which transmission quality is substantially homogeneous, each antenna loop delimiting an interior surface located substantially within a single plane when active; and
a communication unit adapted to exchange information with the memory via the antenna arrangement when said token is arranged in the token storing system in an orientation that allows for communication, said communication unit adapted to select one of said antennas in said antenna arrangement to be active, said communication unit configured to selectively communicate with the memory of each token in said stack of two or more tokens in said enlarged reading and/or writing area associated with said active antenna,
wherein the station is structured and arranged to discriminate between two tokens or among more than two tokens when stacked.

2. The station of claim 1, wherein the token comprises a gaming chip.

3. The station of claim 1, wherein the first and second antennas each comprise respective first and second loops.

4. The station of claim 1, wherein the first and second antennas each comprise an upper loop and a lower loop at least partly superposed on each other and electrically connected in parallel.

5. The station of claim 4, wherein each upper loop and each lower loop lie in two substantially parallel planes and face each other.

6. The station of claim 1, further comprising at least one area of overlap between the antenna loops.

7. The station of claim 1, wherein at least one of the first and second antennas includes a plurality of contiguous superposed turns.

8. The station of claim 7, wherein said plurality of contiguous superposed turns are superposed to a height in the range of between 4 mm and 10 mm.

9. The station of claim 1, wherein the token storage system comprises a storage tray.

10. The station of claim 1, wherein the token storage system comprises substantially parallel upper and lower walls serving as supports for the first and second antennas.

11. The station of claim 10, wherein the first and second antennas are arranged to allow the communication unit to exchange said information with said token regardless of a position of said token in the token storage system and provided that said token is substantially parallel to said upper and lower walls.

12. The station of claim 1, wherein the first and second antennas respectively comprise first and second antenna loops having areas of overlap.

13. The station of claim 12, wherein the token storage system comprises substantially parallel upper and lower walls serving as supports for the first and second loops.

14. The station of claim 1, wherein said communication unit includes a chip discriminating system.

15. The station of claim 1, wherein said communication unit includes a duplicate elimination system.

16. The station of claim 1, wherein said communication unit includes a chip discriminator.

17. The station of claim 1, wherein said communication unit includes a duplicate eliminator.

18. The station of claim 1, wherein said communication unit includes a system for sequential selection of said first and second antennas.

19. The station of claim 1, wherein at least one of said first and second antennas is electrically connected to said communication unit via a phase difference adjusting device.

20. The station of claim 19, wherein the phase difference adjusting device provides adjustment between an electrical voltage at terminals of said first and second antennas and an electrical current flowing in said first and second antennas.

21. The station of claim 19, wherein the phase difference adjusting device is electrically connected to terminals of said antenna arrangement in an immediate vicinity thereof.

22. The station of claim 1, further comprising at least one of a gaming table, a change table, a cash table, and a chip sorting device.

23. The station of claim 22, further comprising of plurality of antennas partially or wholly integrated into at least one of the gaming table, the change table, the cash table, and the chip sorting device.

24. The station of claim is 1, wherein the token storage system comprises one of a portable storage device, a removable storage device, a chip rack, a mobile tray, and a box.

25. The station of claim 24, further comprising a plurality of antennas partially or wholly integrated into at least one of the portable storage device, the removable storage device, the chip rack, the mobile tray, and the box.

26. The station of claim 1, wherein said communication unit is further configured to selectively deactivate each token in said stack of two or more tokens in said enlarged reading and/or writing area associated with said active antenna so that information is exchanged with the memory of each token a single time each time said antenna is activated.

27. The station of claim 26, wherein said communication unit is further configured to send a command to each token in said stack of two or more tokens to remove the deactivate command after the memory of each token within said enlarged reading and/or writing area associated with said active antenna has been communicated with to exchange information.

28. A station for reading and/or writing in a memory of a token having an electronic circuit, said token being arranged in a stack of two or more tokens, said station comprising:
a token storing system;
an antenna arrangement comprising first and second antennas;
at least one of the first and second antennas comprising antenna loops disposed adjacently and being at least partly superposed on each other so as to define an enlarged reading and/or writing area in which transmission quality is substantially homogeneous; and
a communication unit adapted to exchange information with the memory via the antenna arrangement when said token is arranged in the token storing system in an orientation that allows for communication, said communication unit further comprising,
a multiplexing card coupled to said first and second antennas, said multiplexing card being configured for receiving inputs from said first and second antennas and transmitting an output from either said first or second antenna in response to a command, a read/write unit coupled to said multiplexing card, said read/write unit being configured to selectively exchange information with the memory of any token in said stack of two or more tokens by selecting one of said first or second antenna in said antenna arrangement, and a processor communicatively coupled to said read/write unit and said multiplexing card, said processor being configured to generate commands and communicate said commands and other information to said read/write unit, said processor also being configured to generate said command for controlling the output of said multiplexing card based on selecting said first or second antenna, wherein the station is structured and arranged to discriminate between two tokens or among more than two tokens when stacked.

29. A station for reading a memory of a token having an electronic circuit, said token being arranged in a stack of two or more tokens, said station comprising:

a token storing system;

an antenna arrangement comprising first and second antennas;

at least one of the first and second antennas comprising antenna loops disposed adjacently and being at least partly superposed on each other so as to define an enlarged reading area in which transmission quality is substantially homogeneous; and a communication unit adapted to read information from the memory via the antenna arrangement when said token is arranged in the token storing system in an orientation that allows for communication, said communication unit further comprising, a multiplexing card coupled to said first and second antennas, said multiplexing card being configured for receiving inputs from said first and second antennas and transmitting an output from either said first or second antenna in response to a processor command, a read unit coupled to said multiplexing card, said read unit being configured to selectively read information from the memory of any token in said stack of two or more tokens by selecting one of said first or second antenna, said read unit being configured to capture the identity of each token in said stack of said two or more tokens, perform a read operation on the memory of each token in said stack of said two or more tokens, and deactivating each token that was accounted for in said stack of said two or more tokens during said read operation by transmitting a standby command to the memory of said token so that said token is not read a second time, and a processor communicatively coupled to said read unit and said multiplexing card, said processor being configured to generate commands and communicate said commands and other information to said read unit, said processor also being configured to generate said processor command for controlling the output of said multiplexing card based on selecting said first or second antenna, wherein the station is structured and arranged to discriminate between two tokens or among more than two tokens when stacked.

* * * * *